United States Patent [19]

Wechsler

[11] Patent Number: 5,451,443
[45] Date of Patent: Sep. 19, 1995

[54] ARTICLE ANCHORING ACCESSORY FOR USE WITH AQUARIUMS

[76] Inventor: Lawrence I. Wechsler, One Wooleys La., Great Neck, N.Y. 11023

[21] Appl. No.: 338,276

[22] Filed: Nov. 14, 1994

Related U.S. Application Data

[63] Continuation of Ser. No. 46,640, Apr. 14, 1993, abandoned.

[51] Int. Cl.⁶ .................................................. B32B 3/10
[52] U.S. Cl. ........................................ 428/99; 428/137; 119/256; 119/245; 210/169; 47/69; 47/78; 47/79
[58] Field of Search ............... 428/44, 99, 137; 119/5; 210/169; 47/69, 78, 83, 79

[56] References Cited

U.S. PATENT DOCUMENTS

| | | | |
|---|---|---|---|
| 4,118,892 | 10/1978 | Nakamura et al. | 47/83 |
| 4,369,216 | 1/1983 | Willinger | 428/17 |
| 4,699,829 | 10/1987 | Willinger | 428/17 |

FOREIGN PATENT DOCUMENTS 1039188 8/1966 United Kingdom .
2021371 12/1979 United Kingdom .
1575886 10/1980 United Kingdom .

*Primary Examiner*—Alexander S. Thomas

[57] ABSTRACT

An accessory for firmly anchoring plants and the like at the bottom of an aquarium. A generally planar member is sized to fit within the aquarium, and rests in close proximity and parallel with the bottom of the aquarium. A means for removably fastening articles to the planar member is provided, enabling the positioning and attachment of articles, such as live and artificial plants, anywhere along the surface of the planar member. In a preferred embodiment, the planar member comprises a grid having rectangular openings adapted to receive coupling members which fasten to the grid, and also firmly grip the article to be anchored. As part of an under-gravel filtration system, a slotted planar member adapted to receive similar coupling members enables articles to be firmly anchored while at the same time providing filtration of the water within the aquarium.

6 Claims, 3 Drawing Sheets

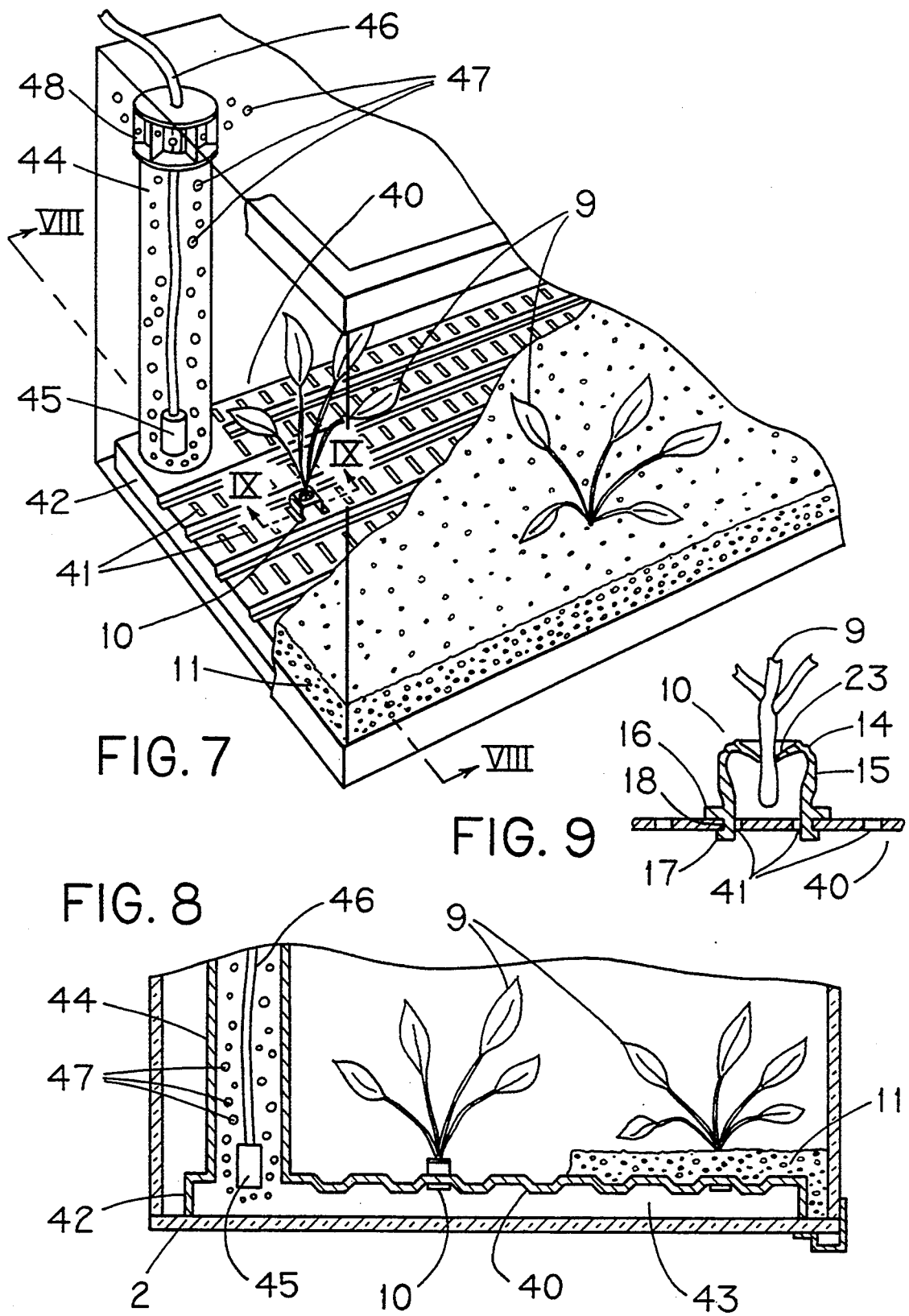

ARTICLE ANCHORING ACCESSORY FOR USE WITH AQUARIUMS

This application is a continuation of application Ser. No. 08/046,640 filed on Apr. 14, 1993, abandoned.

BACKGROUND OF THE INVENTION

This invention relates to aquariums, and more particularly to an apparatus for firmly anchoring aquarium plants and the like beneath the gravel bed.

Decorating an aquarium generally includes the addition of aquatic plants and other items, in order to obtain a natural looking, as well as ecologically balanced environment. Typically, any article added to the bottom of the tank would be partially buried in the gravel substrate at the bottom of the tank. However, since the articles, particularly both live and artificial plants, are generally light in weight, some form of anchoring device is needed in order to keep them in place, and even in certain cases to prevent them from floating to the surface. Live plants have generally been anchored by a weight of some sort, tied to the bottom of the plant, which would assist in securing it under the gravel until roots developed sufficiently. In the case of artificial plants, some type of flat disk or similar member having its surface oriented in the horizontal plane, would be typically affixed to the base of the plant, which when buried under the weight of gravel, would add some degree of stability.

Although these solutions are somewhat effective under conditions of minimal disturbance, when faced with more demanding conditions, they do little to anchor the plants in the location in which they were placed. Strong currents within the tank, as well as stocking the aquarium with larger fish or turtles, would quickly destroy any plant arrangement. In addition, during tank maintenance requiring, among other things, cleaning of the gravel, plants were invariably uprooted. Furthermore, while trying to capture a fish in a net for removal from the tank, plants were easily disturbed, requiring replanting.

Accordingly, it is a principal object of the present invention to provide an apparatus for securing any article, including both live and artificial aquatic plants firmly beneath the substrate at the bottom of the aquarium.

Another object of the present invention is to provide the means for anchoring the plants or articles, while at the same time allowing for easy removal if so desired.

A further object of the present invention is to combine the benefits of under-gravel filtration with a means for firmly anchoring plants and other articles.

Other objects of the present invention are to provide an anchoring device that is simple in design, inexpensive to manufacture and which is hidden from the view of the observer when installed in an aquarium.

SUMMARY OF THE INVENTION

The present invention consists of a generally planar member, adapted to be received within a standard aquarium, and rest at the bottom of the aquarium. In a preferred embodiment, the planar member is perforated, and oriented in the horizontal plane, parallel to, and spaced a short distance above the bottom of the tank. The perforations are generally large enough to allow free passage of the gravel particles used in the substrate, such that gravel, when added to the tank, would fill in below the perforated member. Plants or other objects are secured to the perforated member by coupling members having a means for grasping the plants or other items at their base, and also adapted to firmly engage the perforated member. The weight of gravel above the perforated member is generally sufficient to hold it securely in place, however, if so desired, it could be affixed to the tank bottom with cement, suction cups or the like.

In a preferred embodiment, the perforated member is an open grid, formed from suitable material, such as rigid plastic filaments or ribs, the intersecting ribs forming generally rectangular openings. A spacing means keeps the rigid, generally planar grid member a distance above the bottom of the tank. A plurality of grid components could be connected to one another in the same horizontal plane, to form a single integrated grid member, in order to be suitable for all size tanks. Various types of coupling members can then be fashioned for use in conjunction with the grid member.

In one embodiment, the coupling member is generally an inverted U-shape, fashioned from a suitable resilient material, and having a cross sectional dimension corresponding to the openings in the grid member. At the outer and lower edges of the inverted U-shaped coupling member, and located horizontally, are channels adapted to engage the ribs of the grid member, such that when the coupling member is squeezed together and inserted into the opening, the ribs defining the opening will engage the channels of the coupling member when pressure is released, thereby holding it firmly in place. A hole in the arch of the inverted u-shaped coupling member is smaller than the stem diameter at the base of a plant. Radial slits extend outwardly from the hole, such that when a plant is inserted through the hole, the slits allow the pie shaped segments defined by the slits to extend downwardly, firmly gripping the plant. In the case of live plants, a soft foam insert with slits in contact with the plant is preferred, so as not to damage the stem tissue.

In another embodiment, the coupling member is comprised of an upper and lower planar portion, separated by a spacer portion, such that the upper and lower portions are parallel to each other, and separated by a distance corresponding to the thickness of the ribs of the grid member. The lower portion of the coupling member is generally rectangular, shaped to fit through the opening of the grid member. The upper portion is made large enough not to fit through the opening. The spacer portion is generally circular, having a diameter corresponding to the shorter width of the rectangular opening. The coupling member is inserted into the grid opening until the upper portion rests on the top of the grid member. Twisting the coupling member one quarter of a turn causes the lower rectangular portion to engage the grid member, holding the entire coupling member in place. Plants are held in place by a compression type fitting located at the top of the coupling member.

It is also possible to provide a planar member that is not perforated, but instead has a series of protrusions on the upper surface, allowing attachment to the plants or other article by use of some form of female connector adapted to receive and grasp the protrusions. In that case the planar member would be in direct contact with the bottom of the aquarium.

The planar member can also be fashioned for use as part of an under-gravel filtration unit, wherein the top surface of the filter is a perforated planar member of the present invention. In this case, the perforations would be smaller than the gravel particles, so as to prevent them from entering the filter chamber below the gravel bed.

BRIEF DESCRIPTION OF THE DRAWINGS

FIG. 7 is a perspective view of an embodiment of the present invention as part of an under-gravel filter installed in an aquarium;

FIG. 8 is a sectional view taken on line VIII—VIII of FIG. 7 and further illustrating the under-gravel filter embodiment.

FIG. 9 is a sectional view taken on line IX—IX of FIG. 7 and illustrating the installed coupling member.

DETAILED DESCRIPTION OF THE PREFERRED EMBODIMENT

Figure 1:
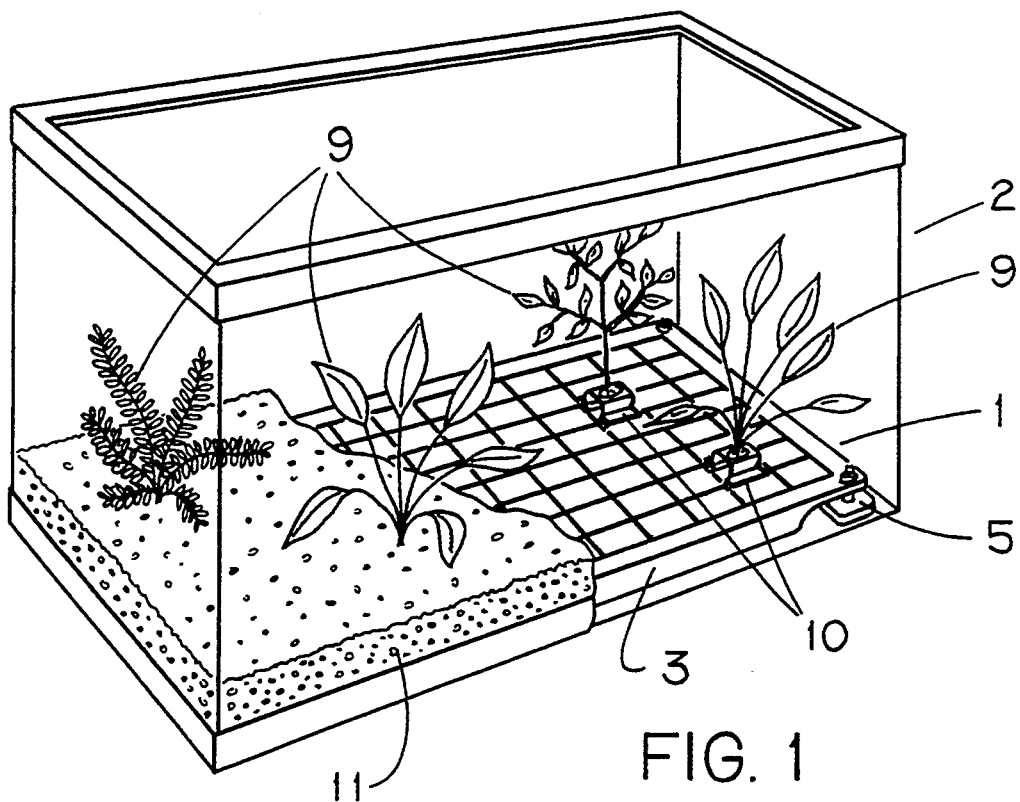
FIG. 1 is a perspective view of one embodiment of the present invention installed in an aquarium.
Figure 2:
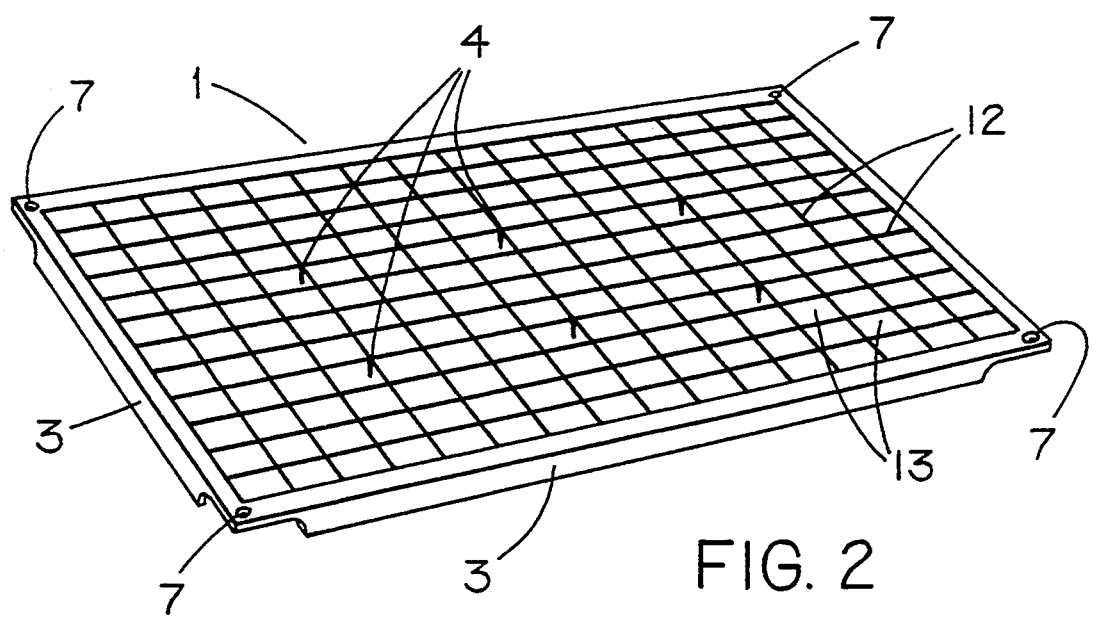
FIG. 2 is a perspective view of the perforated member of the present invention.
Figure 3:
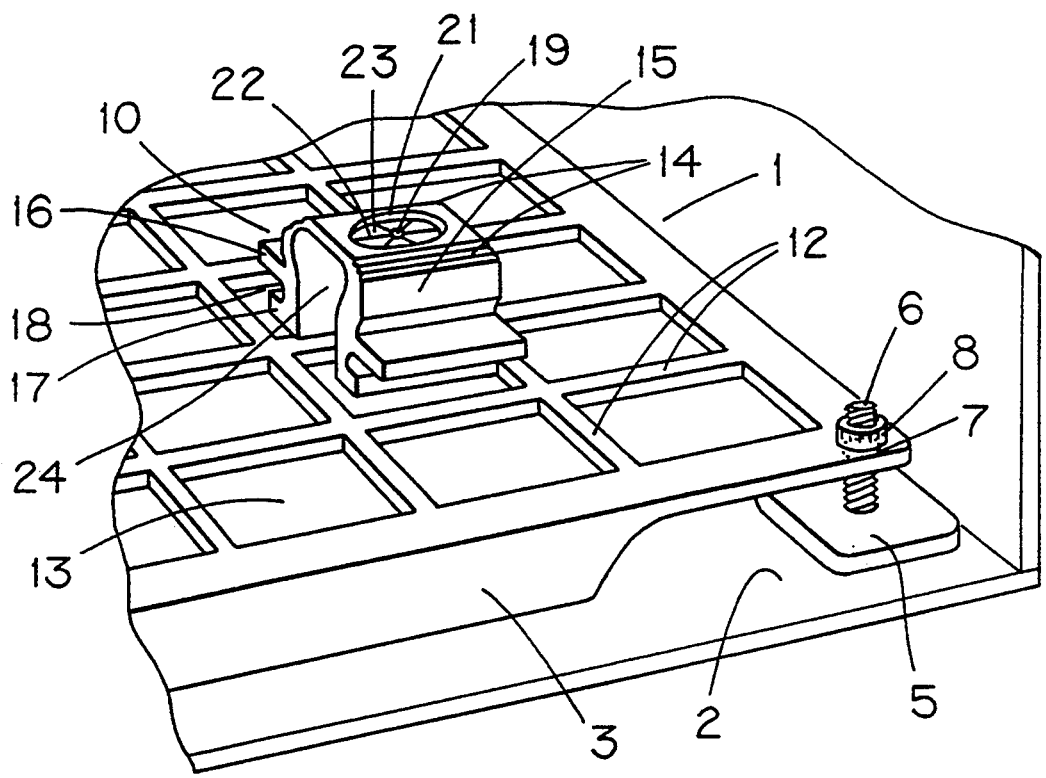
FIG. 3 is an enlarged perspective view of the embodiment in FIG. 1 with the coupling member detached.

Referring now to the FIGS. 1-3, a perforated member 1 is sized to fit into the aquarium 2, and is evenly spaced from the bottom of the tank by the height of a frame 3. Additional spacers 4 arranged along the bottom of the perforated member 1, prevent sagging. The perforated member 1 is secured to the bottom of the aquarium 2 by pads 5 cemented to the bottom of the aquarium 2 and located at each corner of the perforated member 1. A suitable non-toxic silicone glue or the like should be used. The pads 5 are provided with a threaded shaft 6 which fits through clearance holes 7 at each corner of the perforated member 1. A nut 8 holds the perforated member 1 securely at the bottom of the aquarium 2 and yet allows removal of the perforated member 1 when necessary. For less strength, the perforated member 1 can simply be placed at the bottom of the aquarium 2, without affixing it.

Plants 9 are then securely fastened to the clip coupling members 10, and the clip coupling members 10 attached to the perforated member 1 at the desired location within the aquarium 2. Gravel 11 may then be added to the aquarium 2, sufficient to completely cover the perforated member 1 and the clip coupling members 10. The perforated member 1 is somewhat smaller than the aquarium 2, such that when gravel 11 is added, it fills in around the perforated member 1, making the perforated member 1 undetectable to an observer. Should the user decide to change the arrangement of the plants 9 after the addition of gravel 11, the gravel 11 is simply brushed away at the base of a plant 9, exposing the clip coupling member 10 which can then be removed from the perforated member 1. Gravel 11 is then brushed aside at the desired new location, thereby exposing the perforated member 1. The clip coupling member 10 is then re-attached to the perforated member 1, with any remaining gravel 11 around the location allowing enough displacement to permit the installation. Gravel 11 is then rearranged to cover the clip coupling member 10. FIG. 2. illustrates one preferred embodiment of the perforated member, shown alone and generally designated 1. The perforated member 1 is comprised of ribs 12 defining generally rectangular openings 13. This can be a molded product, or can be woven like a mesh from suitable material, i.e. one that is not adversely affected by submersion in water. It is however suggested that the perforated member 1 be made from a fairly rigid material, such that when the clip coupling members 10 are affixed to the perforated member 1, the perforated member 1 retains its shape. The openings 13 are large enough to allow free passage of gravel 11 to insure that there are no pockets of stagnant water beneath the perforated member 1 which might encourage the development of harmful bacteria.

FIG. 3 is a detail of a typical clip type coupling member just prior to installation, generally designated 10. The shape chosen for the purposes of disclosure is readily manufactured by extrusion techniques, making it extremely economical to produce. The clip coupling member 10 is generally an inverted U-shape, and has a pair of flex points 14, that allow it to be compressed when the pressure surfaces 15 are squeezed. The clip coupling member 10 is comprised of a resilient material, such that when pressure is released, it returns to its original shape. Upper flanges 16 and lower flanges 17 are provided along both bottom edges of the clip coupling member 10, and extend outwardly. The lower flanges 17 are adapted to fit into any of the rectangular openings 13 in the perforated member 1 when the clip coupling member 10 is squeezed. When pressure is released, the channel 18 separating the upper flanges 16 and lower flanges 17 receives the ribs 12 of the perforated member 1, thereby holding the clip coupling member 10 in place. A small hole 19 in the arch of the inverted u-shaped clip coupling member 10 is smaller than the stem diameter at the base of a plant 9. A larger hole 21 is counter-sunk in the arch of the clip coupling member 10 such that the material is made thinner and more flexible. Radial slits 22 extend outwardly from the small hole 19, such that when a plant 9 stem is inserted through the small hole 19, the slits 22 allow the pie shaped segments 23 to extent downwardly, firmly gripping the base of the plant 9. In the case of live plants, the larger hole 21 is drilled completely through the clip coupling member 10, and the pie shaped segments 23 are made of soft foam which is affixed to the underside of the arch of the U-shaped clip coupling member 10, such that the soft stem tissue is not damaged by insertion. As roots develop, they can extend downwardly through the opening 13 in the perforated member 1 and out through the open ends 24 of the clip coupling member 10.

Figure 4:
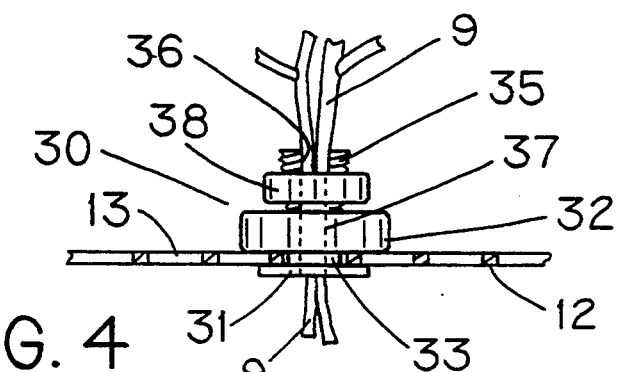
FIG. 4 is a side elevation of a coupling member of another embodiment.
Figure 5:
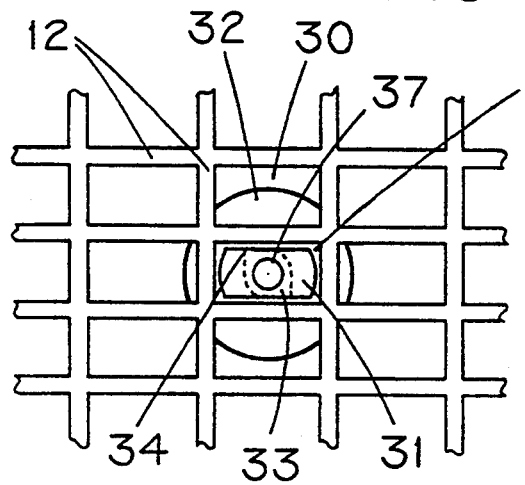
FIG. 5 is a bottom elevation of the embodiment of FIG. 4 showing unlocked coupling member configuration.
Figure 6:
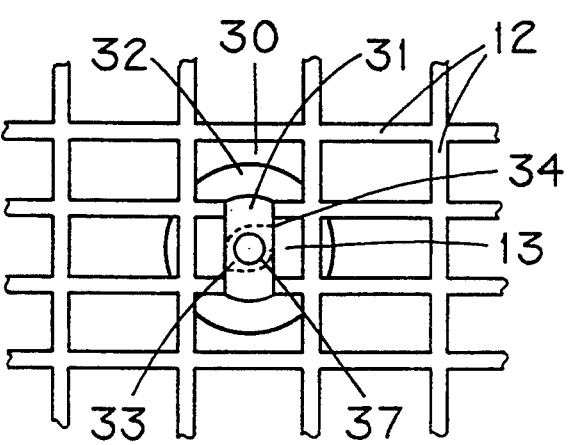
FIG. 6 is a bottom elevation of the embodiment of FIG. 4 showing locked coupling member configuration.

Another embodiment of a coupling member is a twist type, generally designated 30 and is shown in FIGS. 4, 5 and 6. The twist coupling member 30 is comprised of a lower portion 31 having a shape and dimension corresponding to the rectangular opening 13 in the perforated member 1, and having just enough clearance to allow the lower portion 31 to fit through the opening 13. A knurled upper portion 32 is sized larger than the opening in the perforated member 1, allowing it to rest in contact with the upper surface of the perforated member 1 after the lower portion 31 clears the opening. A generally circular middle portion 33 separates the upper portion from the lower portion by a distance equivalent to the thickness of the ribs 12 of the perforated member 1. The cross sectional width of the middle portion 33 corresponds to the shorter dimension of the lower portion 31, allowing the twist coupling member 30 to be rotated after insertion into the any of the openings 13 of the perforated member 1. In the preferred embodiment, instead of being perfectly round, the middle portion 33 of the twist coupling member is squared off at opposing corners 34, permitting rotation of the twist coupling member 30 only one quarter of a turn before the corners 34 engage the ribs 12 of the perforated member 1. After rotation, the lower portion 31 of the twist coupling member 30 engages the ribs 12 of the perforated member 1, and locks the twist coupling member 30. To remove the twist coupling member 30, it is simply rotated one quarter of a turn in the opposite direction. FIGS. 5 and 6 show unlocked and locked positions respectively.

Above the upper portion 32, the twist coupling member 30 is provided with a tapered threaded portion 35 with vertical slots 36. The twist coupling member 30 is also provided with a vertical bore 37 for receiving the base of a plant 9. The taper of the threads on the tapered threaded portion 35 are such that when the compression nut 38 is turned, moving it in an upward direction, the diameter of the vertical bore 37 inside the tapered threaded portion 35 is decreased, squeezing the base of the plant 9 and holding it in place. If the plant 9 is live, it is advisable to wrap the base in a protective material, such as thin foam insulation, before inserting it into the vertical bore 37, to avoid damage to the plant 9.

It should be further pointed out that since many artificial aquarium plants currently being manufactured are provided with some form of anchoring base, they already incorporate a removable coupling means between the plant and the existing anchor. Therefore, in designing a coupling member for use with the present invention, it might be commercially desirable to use a structure matching that of the artificial plant's existing coupling means. In this way, the existing anchor could be removed from the plant, and the plant then fastened, by the same principle, to the coupling member of the present invention. Any number of differently designed planar members as well as coupling members are possible. For example, the planar member need not be perforated, but rather contain a plurality of upward projections onto which some type of female connector adapted to engage the projections, could be fastened. In fact the coupling members can be omitted completely, and the plant or article can have a fastening means as an integral part.

The present invention also has application in the many aquariums equipped with under gravel filtration. Such filters are well known to those skilled in the art, and generally consist of a thin plate having a plurality of narrow slots, adapted to fit under the gravel bed, slightly elevated from the aquarium bottom. A circulating means draws water from under the slotted plate and returns the oxygenated water to the top of the aquarium. In this way, oxygenated water is continually drawn down through the gravel. Under-gravel filters of this type do not rely on mechanical filtration, but rather on the beneficial bacterial bed whose growth is encouraged by the continual oxygenation. By replacing the slotted plate of the under-gravel filter with a perforated or slotted member of the present invention capable of receiving a coupling means, the anchoring of various articles can be accomplished. In such a case, the perforations or slots would be made smaller than the gravel particles.

FIGS. 7-9 illustrate the present invention adapted for use as an under-gravel filter. The perforated member, generally designated 40, contains a plurality of slots 41. A frame 42 completely surrounds the perimeter of the slotted member 40, such that when the slotted member 40 is installed in the aquarium 2, the frame 42 contacts the bottom of aquarium 2 at all points. A lower chamber 43 is thereby formed beneath the slotted member 40, bounded on all sides by the frame 42. Gravel 11, when added to the aquarium 2, remains above the slotted member 40, since the slots 41 are narrower than the dimensions of the gravel 11. A generally vertical chamber 44 extends upwardly from the slotted member 40, said vertical chamber 44 connecting with said lower chamber 43. A bubble stone 45 connected to air supply tubing 46 creates a multitude of upwardly ascending bubbles 47 within the vertical chamber 44. Vents 48 at the top of the vertical chamber 44 allow the bubbles to exit the vertical chamber 44 at the top of the aquarium 2. The continual upward flow of bubbles 47 oxygenates the water, and creates an upward flow of the water in the vertical chamber 44. As a result, water is continually drawn down into the gravel 11 and through the slots 41, replacing the water being drawn out of the lower chamber 43 into the vertical chamber 44. Any type of suitable circulating means may be used with the under-gravel filter, and flow can even be reversed, with water flowing up, through the gravel bed 11.

FIG. 9 is a sectional view taken on line IX—IX of FIG. 7, and illustrates the clip coupling member 10, already described in the previous embodiment. When used with the under-gravel filter embodiment, the lower flanges 17 are dimensioned to fit through the slots 41 of the slotted member 40. The clip coupling member 10 is squeezed together at the pressure surfaces 15, and the flex points 14 allow the lower flanges 17 to be inserted into two adjacent slots 41. The upper flanges 16 prevent the clip coupling member 10 from being inserted too far into the slots 41. When pressure is released, the outer edges of the slots 41 engage the channel 18, firmly holding the clip coupling member 10 in place. A plant 9 is held in place by the pie shaped segments 23 forced downwardly by the plant 9.

Numerous variations to the disclosed structure will be suggested to those skilled in the art. However, it is to be understood that the present disclosure relates to the preferred embodiment of the invention, for purposes of illustration only, and should not be construed as a limitation of the invention.

Having thus described the invention, what is claimed is:

1. The combination of an article anchoring accessory for use in an aquarium and an under-gravel filtration system for the filtration of water contained in said aquarium, comprising:

structure providing a widened support expanse receivable within said aquarium and being securable at one of a location at said bottom and spaced from said bottom of said aquarium;

said structure including a plurality of perforations;

said structure further including means for selectively positioning said article at any one discrete location of a plurality of widened support expanse discrete locations;

means for fastening said article to said widened support expanse at said one discrete location; and means for circulating said water contained in said aquarium through said perforations.

2. The combination according to claim 1, wherein: said means for fastening an article comprises at least one coupling member.

3. The accessory according to claim 1, wherein said structure is made in plural joinable sections.

4. The accessory according to claim 3, wherein each of said plural joinable sections includes at least a portion of said widened support expanse.

5. The accessory according to claim 2, wherein: said at least one coupling member includes means for engaging said widened support expanse; and
said coupling member further includes means for holding said article.

6. The accessory according to claim 1, wherein said means for fastening includes a plurality of upwardly protruding projections carrying male connecting means for cooperating with female connecting means.

* * * * *